(12) United States Patent
Mantha et al.

(10) Patent No.: US 11,843,512 B2
(45) Date of Patent: Dec. 12, 2023

(54) INTEGRATION OF A STANDALONE NON-PUBLIC NETWORK AND A PUBLIC LAND MOBILE NETWORK USING AN APPLICATION FUNCTION SESSION

(71) Applicant: Cisco Technology, Inc., San Jose, CA (US)

(72) Inventors: Ravi Shankar Mantha, Bangalore (IN); Sandeep Dasgupta, Karnataka (IN); Mukesh Yadav, Bangalore (IN)

(73) Assignee: CISCO TECHNOLOGY, INC., San Jose, CA (US)

( * ) Notice: Subject to any disclaimer, the term of this patent is extended or adjusted under 35 U.S.C. 154(b) by 82 days.

(21) Appl. No.: 17/410,105

(22) Filed: Aug. 24, 2021

(65) Prior Publication Data
US 2023/0065081 A1    Mar. 2, 2023

(51) Int. Cl.
*H04L 41/12* (2022.01)
*H04L 67/141* (2022.01)
*H04W 84/04* (2009.01)

(52) U.S. Cl.
CPC ............ *H04L 41/12* (2013.01); *H04L 67/141* (2013.01); *H04W 84/042* (2013.01)

(58) Field of Classification Search
CPC ..... H04L 41/12; H04L 67/141; H04W 84/042
See application file for complete search history.

(56) References Cited

U.S. PATENT DOCUMENTS 8,990,406 B2 * 3/2015 Doss ............. H04W 4/80 709/227
2020/0314701 A1 * 10/2020 Talebi Fard ...... H04W 36/0033
(Continued)

FOREIGN PATENT DOCUMENTS

CN    112654067 A    4/2021
WO    2020081773 A1    4/2020
(Continued)

OTHER PUBLICATIONS

Jerome Henry, et al., "Diffserv to QCI Mapping-01 draft-henry-tsvwg-diffserv-to-qci-01," Network Working Group, https://tools.ietf.org/id/draft-henry-tsvwg-diffserv-to-qci-01.html#rfc.section.4, Apr. 13, 2019, 21 pages.
(Continued)

Primary Examiner — Sm A Rahman
(74) Attorney, Agent, or Firm — Edell, Shapiro & Finnan, LLC

(57) ABSTRACT

Presented herein are efficient techniques in which an application function (AF) session is established between a first policy control function (PCF) in a standalone non-public network (SNPN) domain and a second PCF in a Public Land Mobile Network (PLMN) domain, wherein a user equipment has a first session with the SNPN domain, the AF session is established for a second session of the user equipment with the PLMN domain, and the AF session is bound to the first session. The second PCF obtains an indication of a data flow initiated for the user equipment for the second session within the PLMN domain and determines flow information associated with the data flow. The second PCF transmits to the first PCF the flow information associated with the data flow for creating the data flow in the SNPN domain.

18 Claims, 8 Drawing Sheets

(56) References Cited

U.S. PATENT DOCUMENTS

| | | | |
|---|---|---|---|
| 2021/0058784 A1 | 2/2021 | Kedalagudde et al. | |
| 2022/0030641 A1* | 1/2022 | Wang | H04W 76/10 |
| 2022/0191292 A1* | 6/2022 | Skubic | H04L 67/52 |
| 2022/0240131 A1* | 7/2022 | Yang | H04W 36/0022 |

FOREIGN PATENT DOCUMENTS

| | | | |
|---|---|---|---|
| WO | 2020092173 A1 | 7/2020 | |
| WO | 2020251588 A1 | 12/2020 | |
| WO | 2020264544 A1 | 12/2020 | |

OTHER PUBLICATIONS

3GPP, "3rd Generation Partnership Project; Technical Specification Group Services and System Aspects; Study on enablers for network automation for the 5G System (5GS); Phase 2 (Release 17)," 3GPP TR 23.700-91 V17.0.0, Dec. 2020, 382 pages.

3GPP, "3rd Generation Partnership Project; Technical Specification Group Services and System Aspects; Procedures for the 5G System (5GS); Stage 2 (Release 17)," 3GPP TS 23.502 V17.1.0, Jun. 2021, 692 pages.

3GPP, "3rd Generation Partnership Project; Technical Specification Group Services and System Aspects; System architecture for the 5G System (5GS); Stage 2 (Release 17)," 3GPP TS 23.501 V17.1.1, Jun. 2021, 526 pages.

3GPP, "Informative guideline on supporting session/service continuity between SNPN and PLMN when using N3IWF," SA WG2 Meeting #143e, Change Request, Current version 16.7.0, Jan. 18, 2021, 4 pages.

3GPP, "Informative guideline on supporting session/service continuity between SNPN and PLMN when using N3IWF," SA WG2 Meeting #143e, Change Request, Current version 16.7.0, Jan. 18, 2021, 6 pages.

3GPP, "3rd Generation Partnership Project; Technical Specification Group Core Network and Terminals; 5G System; Policy Authorization Service; Stage 3 (Release 17)," 3GPP TS 29.514 V17.1.0, Jun. 2021, 188 pages.

3GPP, "5G; System architecture for the 5G System (5GS) (3GPP TS 23.501 version 16.6.0 Release 16)," ETSI TS 123 501 V16.6.0, Oct. 2020, 450 pages.

* cited by examiner ically are emerging that can involve a Standalone Non-Public Network (SNPN); however, it can be challenging to integrate an SNPN with a Public Land Mobile Network (PLMN).

INTEGRATION OF A STANDALONE NON-PUBLIC NETWORK AND A PUBLIC LAND MOBILE NETWORK USING AN APPLICATION FUNCTION SESSION

TECHNICAL FIELD

The present disclosure relates to network equipment and services.

BACKGROUND

Networking architectures have grown increasingly complex in communications environments, particularly mobile networking environments. With the introduction of Third Generation Partnership Project (3GPP) Fifth (5th) Generation (5G) technologies, new use cases are emerging that can involve a Standalone Non-Public Network (SNPN); however, it can be challenging to integrate an SNPN with a Public Land Mobile Network (PLMN).

DESCRIPTION OF EXAMPLE EMBODIMENTS

Overview

Figure 1:
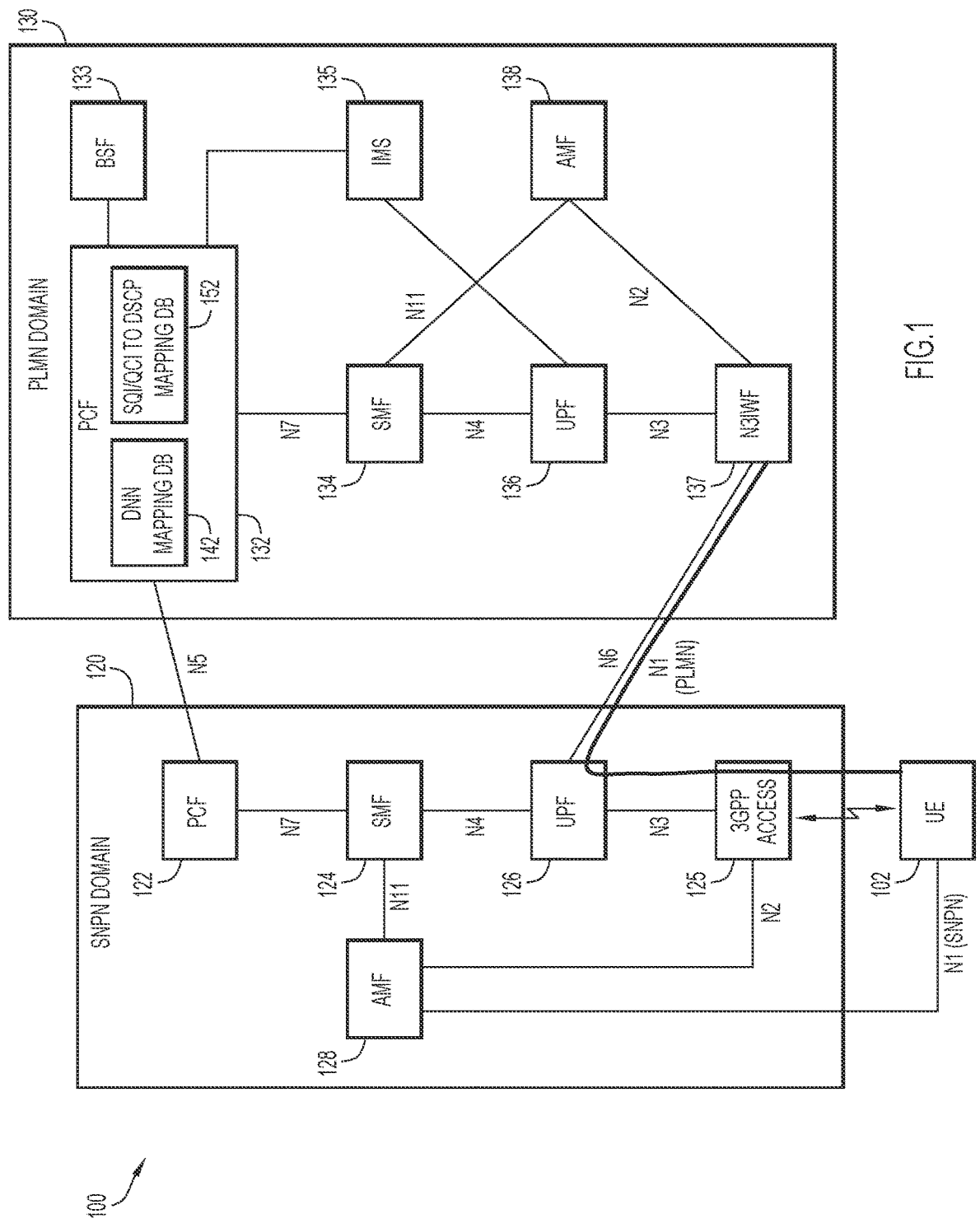
FIG. 1 is a diagram of a system in which techniques that facilitate mirroring of a Public Land Mobile Network (PLMN) session of a PLMN domain in a Standalone Non-Public Network (SNPN) domain may be implemented, according to an example embodiment.

Third (3rd) Generation Partnership Program (3GPP) standards, such as 3GPP Technical Specification (TS) 23.501, have defined ways to integrate/support non-public and public networks and their architectures. Access to Public Land Mobile Network (PLMN) services via a Standalone Non-Public Network (SNPN) involves quality of service (QoS) enforcement in the SNPN domain for PLMN flows according to service level agreements between SNPN and PLMN operators. Currently, two mechanisms are defined for QoS enforcement:

1. A first mechanism is network requested QoS, which is largely policy driven, dynamic control plane signaling is not involved. In this first mechanism, the creation of PLMN flows are detected from a data path, which creates a delay in enforcing the QoS. In this first mechanism, deletion of PLMN flows are detected based on idle timers, which may waste SNPN radio access network (RAN) and/or core network resources.
2. A second mechanism is user equipment (UE) requested QoS, in which control plane signaling is implemented via the UE. This mechanism involves UE implementation and may not align to service level agreements between different PLMNs and SNPNs, which may cause extra signaling.

Presented herein are efficient techniques for overcoming the drawbacks of the above two mechanisms by providing a signaling-based network-triggered mirroring of PLMN sessions in the SNPN domain to ensure QoS according to SNPN and PLMN service level agreements. Techniques discussed herein provide a quality of experience for end user for PLMN flows while the UE is registered in the SNPN domain.

In at least one embodiment, a method is provided that may include establishing an application function (AF) session between a first policy control function (PCF) in a standalone non-public network (SNPN) domain and a second PCF in a Public Land Mobile Network (PLMN) domain, wherein a user equipment has a first session with the SNPN domain and, the AF session is established for a second session of the user equipment with the PLMN domain; obtaining, by the second PCF, an indication of a data flow initiated for the user equipment for the second session within the PLMN domain; determining flow information associated with the data flow; and transmitting, from the second PCF to the first PCF, the flow information associated with the data flow for creating the data flow in the SNPN domain.

Example Embodiments

Fifth (5th) Generation (5G) technologies support an enterprise network called Non-Public Networks (NPNs), which are enterprise deployed networks. 5G standards define mechanisms in which non-public networks may be deployed. One such mechanism is standalone, in which the enterprise owns the core network and the access network may be owned by the enterprise or by a service provider. An NPN, such as an SNPN, is a 5G network that provides dedicated services to a defined group of devices. A PLMN is a network that provides wireless communication services from a service provider.

3GPP standards have defined integration of the SNPN with the PLMN. For example, a user may be connected to an SNPN network, also referred to as an SNPN domain and be interested in utilizing a service, such as an Internet Protocol (IP) multimedia subsystem (IMS) service or a Voice over Long-Term Evolution (VoLTE) service, provided by a PLMN network, also referred to as a PLMN domain. In this situation, a user equipment (UE) may establish a first session in the SNPN domain and may establish a second session in the PLMN domain via the SNPN domain to access IMS, VoLTE, or other services provided by the PLMN domain. A QoS for a data flow associated with the PLMN services may be guaranteed in the PLMN domain but the QoS may not be guaranteed in the SNPN domain.

Presented herein are techniques for providing signaling-based QoS enforcement for a data flow in an SNPN domain that mirrors the QoS enforcement for the data flow in a PLMN domain. In one implementation, a UE may establish a session with the PLMN domain through the SNPN domain. When a partnership exists between the PLMN and the SNPN, an Application Function (AF) session between a Policy Control Function (PCF) in the PLMN domain and a PCF in the SNPN domain may be established. When a data flow is getting established between the UE and an application in the PLMN domain, the PCF in the PLMN domain may transmit information associated with the data flow to the PCF in the SNPN domain via an N5 interface to populate policies associated with the PLMN data flow onto the SNPN domain. Transmitting the data flow information to the PCF in the SNPN domain may allow the PLMN session to be mirrored in the SNPN domain to enforce the QoS levels of the data flow in the SNPN domain.

Referring to FIG. 1, FIG. 1 is a block diagram of a system 100 in which techniques that provide QoS enforcement in an SNPN domain via an AF session between a PCF in the SNPN domain and a PCF in the PLMN domain may be implemented, according to an example embodiment. System 100 may include a UE 102, an SNPN domain 120, and a PLMN domain 130. SNPN domain 120 may include a PCF 122, a Session Management Function (SMF) 124, a 3GPP access 125, a User Plane Function (UPF) 126, and an Access and Mobility Management Function (AMF) 128. PLMN domain 130 may include a PCF 132, a Binding Support Function (BSF) 133, an SMF 134, an Internet Protocol (IP) multimedia subsystem (IMS) 135, a UPF 136, and a non-3GPP interworking function (N3IWF) 137.

UE 102 may establish a Packet Data Network (PDN) connection, also referred to as a Protocol Data Unit (PDU) session, in the SNPN domain 120. For example, UE 102 may establish a connection with a data network (not shown) via 3GPP access 125, AMF 128, and SMF 124 to access the data network via UPF 126 in the SNPN domain 120. 3GPP access 125 may include any combination of hardware (e.g., communications units, receiver(s), transmitter(s), antenna(s) and/or antenna array(s), processor(s), memory element(s), baseband processor(s) (modems), etc.)), software, logic, and/or the like that may facilitate access network connections for one or more elements of systems discussed herein, including, but not limited to, over-the-air Radio Frequency (RF) communications with UE 102. In one implementation, 3GPP access may be implemented as a gNodeB. 3GPP access 125 may interface with AMF 128 via an N2 interface. Typically, an AMF, such as AMF 128 or AMF 138, provides access authentication services, authorization services, and mobility management control functions. UE 102 may interface with AMF 128 via an N1 interface (illustrated as N1 (SNPN) in FIG. 1), which is provided via 3GPP access 125.

AMF 128 may interface with SMF 124 via an N11 interface. Similarly, AMF 138 may interface with SMF 134 via an N11 interface. An SMF, such as SMF 124 or SMF 134, provides protocol data unit (PDU) session management services, IP address allocation services, and downlink notification management services. SMF 124 may interface with PCF 122 via an N7 interface and may interface with UPF 126 via an N4 interface. Similarly, SMF 136 may interface with PCF 132 via an N7 interface and may interface with UPF 136 via an N4 interface. Typically a PCF, such as PCF 122 or PCF 132, provides policy rules (e.g., network slicing, roaming, mobility management, etc.) for control plane functions and supports quality of service policy and charging control functions. Typically, a UPF, such as UPF 126 or UPF 136, supports features and capabilities to facilitate user plane operation, such as packet routing and forwarding, interconnection to a data network, policy enforcement, and data buffering for 5G network connectivity. UPF 126 may interface with 3GPP access 125 via an N3 interface and with N3IWF 137 in the PLMN domain 130 via an N6 interface. UPF 136 may interface with N3IWF 137 via an N3 interface.

After UE 102 has established the PDU session in the SNPN domain 120, UE 102 may seek to connect to the PLMN domain 130 to avail PLMN services over the N3IWF 137 and establish a second PDN connection/PDU session in the PLMN domain 130 to utilize services provided in the PLMN domain 130, such as services provided by IMS 135. Typically, an IMS, such as IMS 135, provides IP multimedia services to a UE, such as UE 102. The IMS 135 may interface with PCF 132 and UPF 136 of the PLMN domain 130. UE 102 may use the PDN connection established in the SNPN domain 120 to connect to the PLMN domain 130 as an untrusted 3GPP access. As shown in FIG. 1, UE 102 may establish a PDU session with the PLMN domain 130 via 3GPP access 125 and UPF 126 in the SNPN domain 120 and NWIWF 137 in the PLMN domain 130 via an N1 interface (illustrated as N1 (PLMN) in FIG. 1). Once the PDN connection is established, UE 102 may access IMS 135 (or another application in the PLMN domain 130) via UPF 126, N3IWF 137, and UPF 136. Typically, an N3IWF, such as N3IWF 137, provides an interworking between untrusted non-3GPP networks and the 5G core network.

In scenarios where a partnership exists between the PLMN domain 130 and the SNPN domain 120, PCF 122 may support an N5 interface between PCF 122 and PCF 132 to control QoS levels of PLMN flows in the SNPN domain 120. For example, as discussed below with respect to FIGS. 2 and 3, PCF 132 may create an AF session on PCF 122 using a generic public subscription identifier (GPSI) associated with UE 102 and a data network name (DNN) associated with UE 102 in the SNPN domain as binding parameters. As illustrated in FIG. 1, PCF 132 can maintain a DNN mapping database (DB) 142 that maps DNNs in the SNPN domain 120 to DNNs in the PLMN domain 130. The SMF 134 can propagate the N3IWF 137 address (e.g., Internet Protocol (IP) address) on the N7 interface in the PLMN domain 130 to the PCF 132. As illustrated in FIG. 1, the PCF 132 can maintain a 5G QoS Identifier (5QI)/QoS Class Identifier (QCI) to Differentiated Services Code Point (DSCP) mapping DB 152 that maps QCI values (for 4G flows) or 5QI values (for 5G flows) to DSCP values for each flow. Such a mapping can also be maintained on the N3IWF 137 such that both PCF 132 and N3IWF 137 are in sync regarding QCI/5QI to DSCP mapping for UE 102 flows.

PCF 132 may transmit information associated with a data flow, such as the N3IWF 137 address, and DSCP based filters, QoS information (e.g., Maximum Bit Rate (MBR), Guaranteed Bit Rate (GBR)), QCI/5QI, Allocation and Retention Policy (ARP) values, etc. to PCF 122, which will trigger the PCF 122 to request SMF 124 in the SNPN domain 120 to create a mirrored dedicated flow in the SNPN domain 120 so the equivalent QoS levels associated with the UE 102 flow(s) may be mirrored in the SNPN domain 120. The SMF 124 will send the N3IWF address and DSCP based filters to UE 102 so that UE 102 maps the IP Security (IPSec) flows corresponding to PLMN domain flow onto the existing SNPN session of UE 102.

By establishing the AF session and transmitting parameters associated with the data flow from PCF 132 to PCF 122, a QoS associated with a data flow in the PLMN domain 130 may be enforced in the SNPN domain 120, which may contribute to a quality of experience for a user accessing services in the PLMN domain 130 while registered in the SNPN domain 120.

Thereafter, if the PLMN flow is removed by PCF 132, the equivalent (mirrored) flow in the SNPN domain 120 by the PCF 132 in the PLMN domain 130 toward PCF 122 in the SNPN domain 120 trigger removal of the equivalent flow in the SNPN domain. Once the PLMN PDU session for UE 102 is deleted in the PLMN domain 130, the PCF 132 in the PLMN domain 130 will trigger removal of application session binding in the SNPN domain via the PCF 122 in the SNPN domain 120.

In various embodiments, UE 102 may be associated with any electronic device, machine, robot, etc. wishing to initiate a flow in systems discussed herein. The terms 'device', 'electronic device', 'UE', 'automation device', 'computing device', 'machine', 'robot', and variations thereof are inclusive of devices used to initiate a communication, such as a computer, a vehicle and/or any other transportation related device having electronic devices configured thereon, an automation device, an enterprise device, an appliance, an Internet of Things (IoT) device, etc., a personal digital assistant (PDA), a laptop or electronic notebook, a cellular telephone, a smart phone, an Internet Protocol (IP) phone, any other device and/or combination of devices, component, element, and/or object capable of initiating voice, audio, video, media, or data exchanges within system 100. UE 102 discussed herein may also be inclusive of a suitable interface to a human user such as a microphone, a display, a keyboard, or other terminal equipment. UE 102 discussed herein may also be any device that seeks to initiate a communication on behalf of another entity or element such as a program, a database, or any other component, device, element, or object capable of initiating an exchange within systems discussed herein. It is to be understood that any number of UEs may be present in systems discussed herein. UE 102 may be configured with hardware (e.g., communications units, receiver(s), transmitter(s), antenna(s) and/or antenna arrays, processor(s), memory element(s), baseband processor(s) (modems), etc.)], software, logic, and/or the like (e.g., a 4G cellular communications unit, a 5G cellular communications unit, a Wi-Fi® communications unit, etc.) to facilitate over-the-air interfaces with any combination of RANs.

Figure 2:
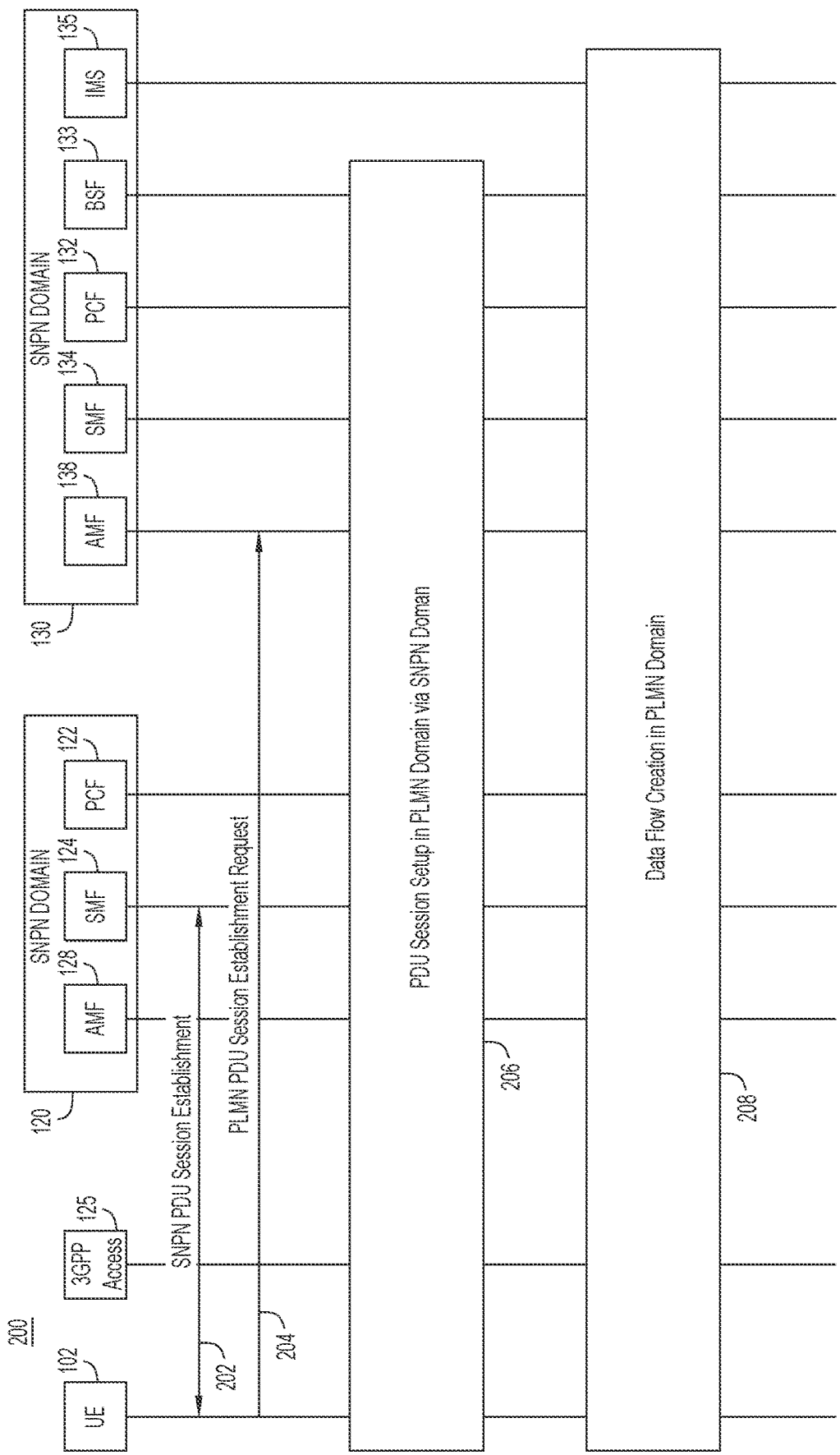
FIG. 2 is a message sequence diagram illustrating a call flow associated with performing a Protocol Data Unit (PDU) session setup and a dedicated flow creation in the PLMN domain via the SNPN domain, according to an example embodiment

Referring to FIG. 2, FIG. 2 is a message sequence diagram illustrating a call flow 200 that illustrates an example PDU session setup and data flow creation in PLMN domain 130. FIG. 2 includes UE 102, 3GPP access 125, AMF 128, SMF 124, PCF 122, AMF 138, SMF 134, PCF 132, BSF 133, and IMS 135. Various operations, elements, and/or steps involved in the methods described in FIG. 2 may be omitted for purposes of brevity.

As shown in FIG. 2, at 202, UE 102 may establish an SNPN PDU session via SMF 124. For example, UE 102 may establish a first session with a data network (not shown) via SNPN domain 120. The SNPN PDU session setup may be performed using standards-based operations, as prescribed at least by 3GPP TS 23.502, Section 4.3.2.2.1. At 204, UE 102 may transmit a PLMN PDU session establishment request to AMF 138 to set up a PDU session with the PLMN domain 130 through the SNPN domain 120 (e.g., as prescribed at least by 3GPP TS 23.502, Section 4.3.2.2.1). For example, UE 102 may transmit the session establishment request to utilize PLMN services, such as services provided by IMS 135.

At 206, a PDN connection/PDU session setup may be performed to establish the PDU session in PLMN domain 130. In one implementation, UE 102 may establish a connection with the PLMN domain 130 through the SNPN domain 120 via N3IWF 137. Operations at 206 may involve both standards-based operations as prescribed at least by 3GPP TS 23.502, Section 4.3.2.2.1 along with enhanced operations for creating an AF session between PCF 132 of the PLMN domain 130 and PCF 122 of the SNPN domain 120. For example, as further described below with respect to FIG. 3, when a partnership exists between PLMN domain 130 and SNPN domain 120 (e.g., between operators of the SNPN domain 120 and the PLMN domain 130), PCF 132 may establish an AF session on PCF 122 using information associated with the PLMN PDU session for UE 102.

At 208, a data flow may be created in the PLMN domain 130. For example, a data flow may be initiated for UE 102 for the PDU session within the PLMN domain 130. As further described below with respect to FIG. 4, PCF 132 may transmit information associated with the data flow to PCF 122 via an N5 interface to mirror the session in the SNPN domain 120 to ensure that QoS levels associated with the data flow are met in the SNPN domain 120 according to an agreement between SNPN domain 120 and PLMN domain 130.

Figure 3:
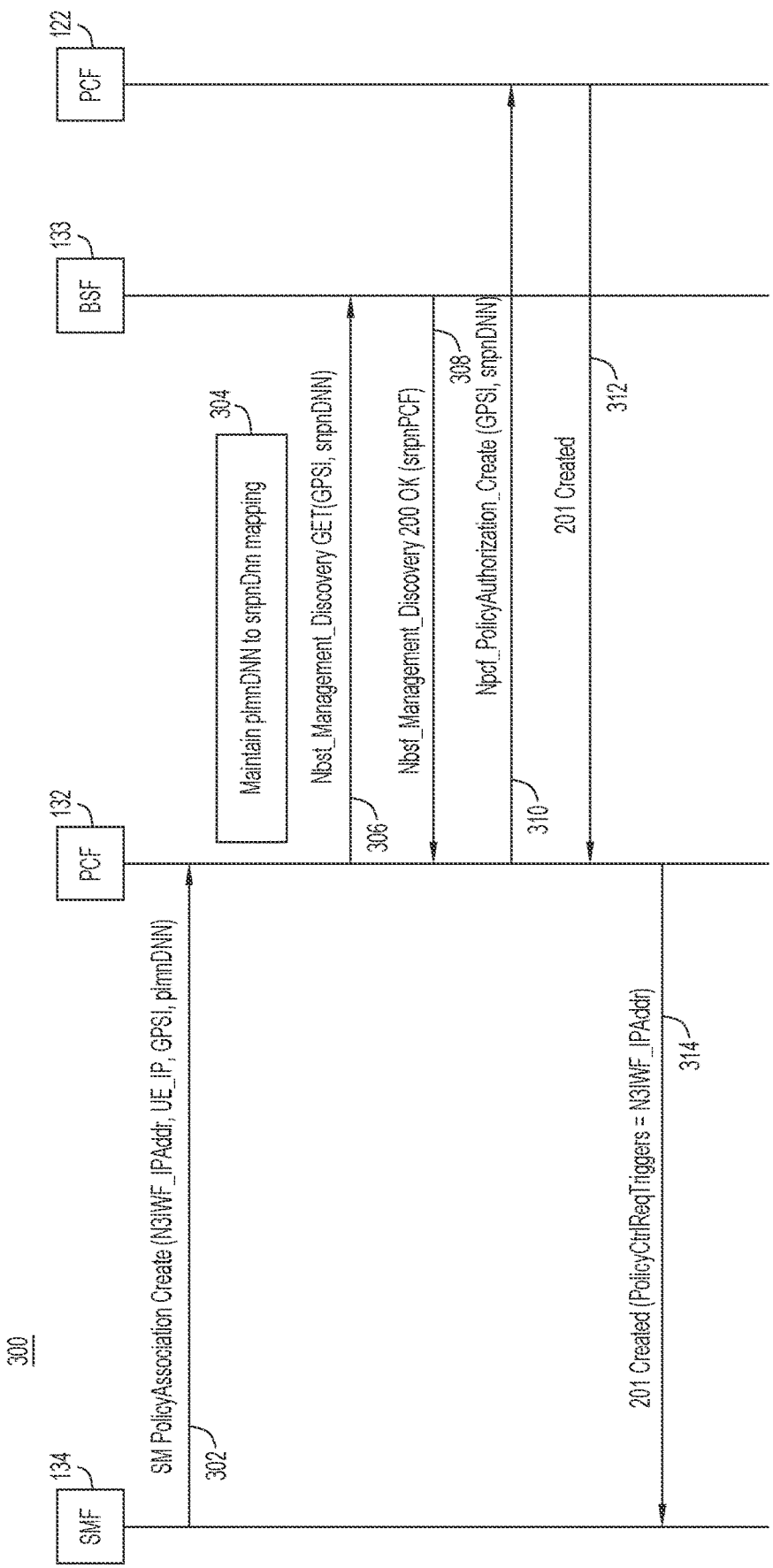
FIG. 3 is a message sequence diagram illustrating a call flow associated with performing a PDU session setup in the PLMN domain via the SNPN domain involving an Application Function (AF) session setup between a Policy Control Function (PCF) in the PLMN domain and a PCF in the SNPN domain, according to example embodiments.

Referring to FIG. 3, FIG. 3 is a message sequence diagram illustrating a call flow 300 that illustrates example details associated with PDN connection/PDU session setup in PLMN domain 130 involving an AF session setup between a PCF 132 in the PLMN domain 130 and PCF 122 in the SNPN domain 120, according to example embodiments. Call flow 300 describes example communications that can be exchanged in 206 of FIG. 2 that are enhancements to other 3GPP standards-based operations (not shown) that may be performed at 206 for the PDU session establishment for UE 102 in the PLMN domain 130 as prescribed at least in part. FIG. 3 includes SMF 134 PCF 132 and BSF 133 of the PLMN domain 130 and PCF 122 of the SNPN domain 120.

For the example described with reference to FIG. 3, assume that UE 102 has established a first PDU session with a data network via SNPN domain 120 and has established a second PDU session with PLMN domain 130 through SNPN domain 120 and N3IWF 137. As shown in FIG. 3, at 302, SMF 134 transmits a session management (SM) Policy Association Create message (e.g., a 3GPP SM_PolicyAssociation_Create message) to PCF 132 over the N7 interface. The Policy Association Create message may include an IP address associated with N3IWF 137, an IP address associated with UE 102, a GPSI associated with UE 102, and a DNN associated with the PLMN data network. In one implementation, UE 102 may be connected to PLMN domain 130 from an evolved Packet Data Gateway (ePDG). In this implementation, SMF 134 may transmit an address of the ePDG over the N7 interface toward PCF 132.

As shown at 304, PCF 132 maintains DNN mapping DB 142 and PCF 132 may utilize the DNN mapping DB 142 to determine a DNN in the SNPN domain 120 that corresponds to the DNN in PLMN domain 130 received from SMF 134.

To create an AF session with SNPN domain 120, PCF 132 determines with which PCF in the SNPN domain 120 PCF 132 should connect. To put it another way, PCF 132 discovers a PCF associated with UE 102's first session in SNPN domain 120 and forms a connection with the discovered PCF. At 306, PCF 132 transmits an Nbsf_Management_ Discovery GET request to BSF 133 to discover PCF 122. Generally a BSF, such as BSF 133, binds various sessions that originate on different interfaces in a network, but share common criteria, such as sessions belonging to the same subscriber. A BSF may support the ability to create various binding records and route data to the appropriate PCF based on the binding information. PCF 132 transmits the GPSI associated with UE 102 and the DNN in SNPN domain 120 to BSF 133 in the Nbsf_Management_Discovery GET request to use as binding parameters to discover PCF 122.

At 308, BSF 133 transmits an Nbsf_Management_Discover 200 OK message to PCF 132 that includes an identifier associated with PCF 122. At 310, PCF 132 transmits a Npcf_PolicyAuthorization_Create message to PCF 122 to create an AF session binding between the PDN connection in SNPN domain 120 and PCF 132. The policy authorization create message may include the GPSI of UE 102 and the DNN in SNPN domain 120. At 312, PCF 122 creates the AF session with PCF 132 and transmits a "201 Created" message to PCF 132. At 314, PCF 132 forwards a 201 Create message to SMF 134 indicating that the AF session has been created. PCF 132 additionally transmits to SMF 134 an indication that the IP address change of N3IWF 137 is to be defined as one of the PolicyCtrlReqTriggers and supported. In this way, a PCF trigger for a N3IWF change (CH_N3IWF) is introduced in PolicyCtrlReqTriggers on the N7 interface that indicates that the PCF (e.g., PCF 132) is to be notified by the SMF (e.g., SMF 134) when there is a change in the N3IWF associated with a PLMN session.

When UE 102 is no longer utilizing services provided by PLMN domain 130 and the PLMN session is to be deleted in PLMN domain 130, PCF 132 will trigger Npcf_PolicyAuthorization_Delete to remove the application session binding in the SNPN domain 120.

Figure 4:
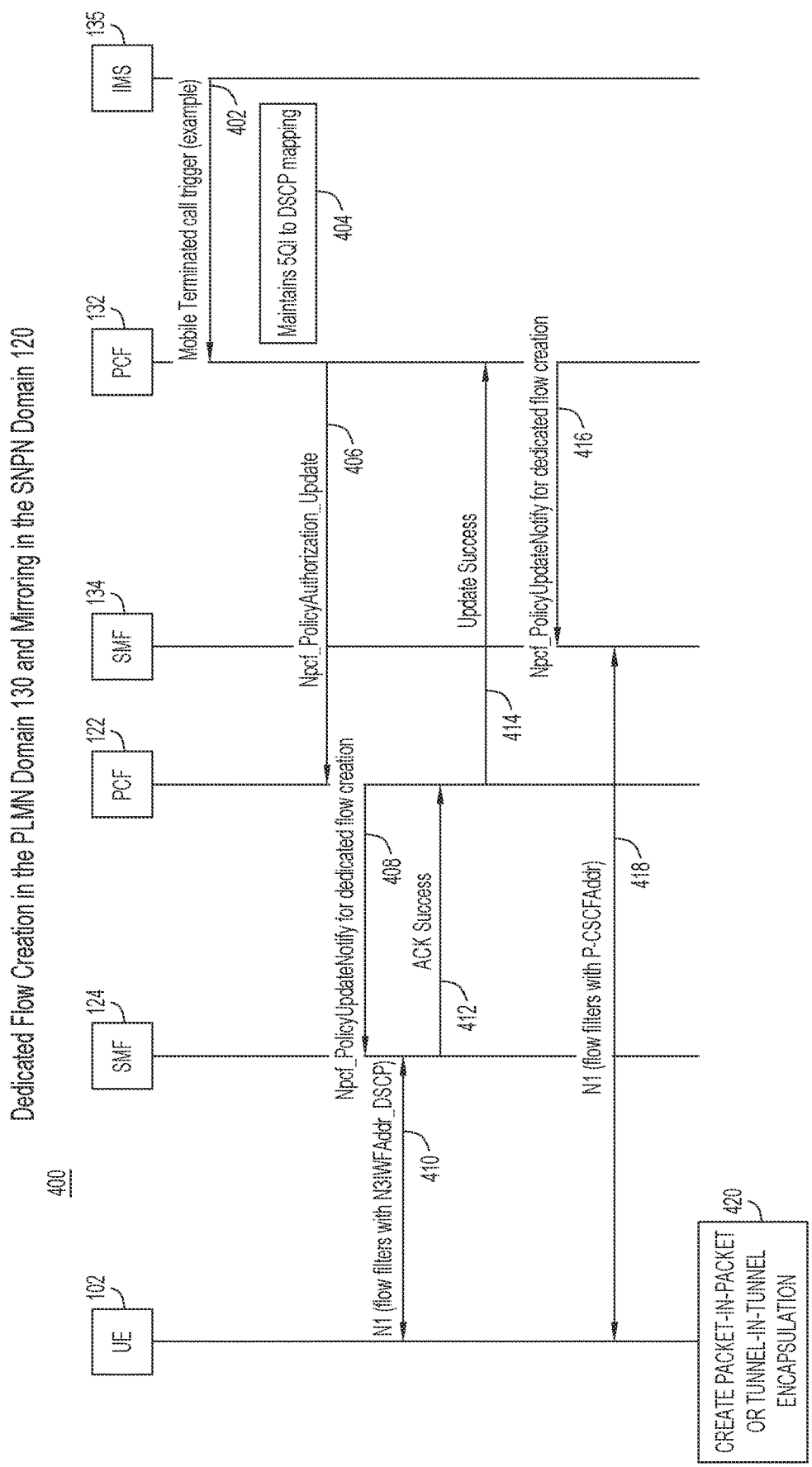
FIG. 4 is a message sequence diagram illustrating a call flow associated with creating a dedicated flow in the PLMN domain and mirroring the flow in the SNPN domain, according to example embodiments.

Referring to FIG. 4, FIG. 4 is a message sequence diagram illustrating a call flow 400 that illustrates an example dedicated flow setup in PLMN domain 130 and mirroring the flow in the SNPN domain, according to example embodiments. Call flow 400 describes example communications that can be exchanged in 208 of FIG. 2 that are enhancements to other 3GPP standards-based operations (not shown) that may be performed at 208 for dedicated flow creation in the PLMN domain 130 and mirroring of the dedicated flow in the SNPN domain 120 as prescribed at least in part. FIG. 4 includes UE 102, SMF 124 and PCF 122 of the SNPN domain 120 and SMF 134, PCF 132, and IMS 135 of the PLMN domain 130.

FIG. 4 illustrates an example of a dedicated flow creation in PLMN domain 130 when UE 102 accesses services provided by an application in PLMN domain 130. In the example given with respect to FIG. 4, assume UE 102 is accessing services provided by IMS 135 (although UE 102 may access services provided by a different application in PLMN domain 130) for an IMS voice call involving UE 102.

Referring to FIG. 4, at 402, for the dedicated flow creation, PCF 132 obtains a trigger from an application domain (i.e., from an application whose services UE 102 is accessing) in PLMN domain 130. In the example given in FIG. 4, the trigger includes a Mobile_Terminated call trigger from IMS 135 for a voice call for UE 102. As illustrated at 404, PCF 132 maintains 5QI/QCI to DSCP mapping DB 152 that maps QCI/5QI values to DSCP values. N3IWF 137 may maintain the same mapping such that the mapping at PCF 132 may be synchronized with the mapping at N3IWF 137. A data flow associated with an application may be assigned a QCI/5QI value that indicates a QoS level associated with the data flow. The QCI/5QI values may be standard values that are based on an application associated with the data flow. For example, IMS signaling data flows may be assigned a 5QI value of five (5) and a voice call may be assigned a 5QI value of one (1). The QCI/5QI values may be mapped to DSCP values on a per operator basis and based on an operator's policy. The mapping is consistent with the IP backbone where backend routers prioritize the traffic as per the DSCP. Example QCI/5QI to DSCP mappings may include broadcast video traffic being mapped to CS3 DSCP and QCI 4 and telephony traffic being mapped to an Expedited Forwarding (EF) DSCP and either a QCI of 1 for GBR traffic or a QCI of 7 for non-GBR traffic, as prescribed at least in part in Diffserv to QCI Mapping-01 (draft-henry-tsvwg-diffserv-to-qci-01, published Apr. 13, 2019). Other example mappings can be envisioned.

PCF 132 may utilize the QCI/5QI to DSCP mapping to determine a DSCP value that corresponds to the QCI/5QI value associated with the data flow from IMS 135 for the voice call for UE 102. A DSCP value may be used, in part, to identify a PLMN data flow in SNPN domain 120. Different data flows may traverse different tunnels (such as IPSec tunnels) based on a priority associated with the data flow. A tunnel associated with a data flow may be determined, at least in part, based on DSCP values associated with packets in the data flow. IPSec is a secure network protocol that authenticates and encrypts packets of data to provide secure encrypted communication over an IP network.

At 406, PCF 132 transmits an Npcf_PolicyAuthorization_Update message to PCF 122 to mirror the equivalent QoS level for the data flow in SNPN domain 120. For PDU sessions and data flows created in PLMN domain 130, PCF 132 may create a MediaComponent with an IP address of the N3IWF through which the PDU session is established and the corresponding DSCP value associated with the data flow. A MediaComponent may be sent on an N5 interface from an Application Function (e.g., a Proxy Call Session Control Function (P-CSCF) at IMS 135) to a PCF (e.g., PCF 132) to identify a specific traffic flow and associated treatment (e.g., QoS) required for the traffic flow. The N3IWF IP address and the DSCP value may be used to identify packets associated with different data flows. In the example given in FIG. 4, an IMS session between UE 102 and IMS 135 may include more than one data flow. For example, the IMS session may include a signaling flow, a voice flow including voice packets, and a video flow including video packets. Each flow may be labeled with a different DSCP value (e.g., based on whether the flow is a signaling flow, a voice flow, or a video flow). Different flows may be associated with different QoS levels and may traverse different tunnels between UE 102 and IMS 135. The DSCP value may indicate an IPSec tunnel between UE 102 and N3IWF 137 through which packets in the data flow will traverse and a tunnel between N3IWF 137 and IMS 135 through which packets in the data flow will traverse.

The Npcf_PolicyAuthorization_Update message transmitted at 406 includes flow details for the data flow as part of the MediaComponent. The flow details may include, for example, the DSCP value corresponding to the QCI/5QI value, an address of N3IWF 137 in flow filters, a QoS associated with the application (e.g., IMS 135), ARP values received from the application (e.g., IMS 135), etc. Transmitting the data flow information to the PCF in the SNPN domain may allow the PLMN session to be mirrored in the SNPN domain to enforce the QoS levels of the data flow in the SNPN domain. At 408, PCF 122 transmits a Npcf_SM-PolicyControl_UpdateNotify request to SMF 124 to create a mirrored dedicated flow in the SNPN domain 120. The Npcf_SMPolicyControl_UpdateNotify request may include the data flow information received from PCF 132.

At 410, SMF 124 transmits the received flow filters including the IP address of N3IWF 137 and the DSCP value for the flow to UE 102 via AMF 128 and the 3GPP access 125 (not shown in FIG. 4) over the N1 interface and receives an ACK from UE 102 indicating that the dedicated flow creation in the SNPN domain 120 is successful. UE 102 may store the information for addressing packets destined for IMS 135 during the IMS session. For example, packets destined for IMS 135 may first go through an IPSec tunnel to N3IWF 137. Therefore, packets transmitted toward IMS 135 may include the IP address of N3IWF 137 and the DSCP value associated with the data flow.

At 412, SMF 124 may transmit an ACK to PCF 122 indicating that the dedicated flow creation in the SNPN domain 120 is successful. At 414, once the dedicated flow creation is successful in the SNPN domain 120, PCF 132 is updated by PCF 122 regarding the successful update. At 416, PCF 132 transmits an Npcf_PolicyUpdateNotify message to SMF 134 for the dedicated flow creation to proceed with the dedicated bearer flow creation in the PLMN domain 130. The Npcf_PolicyUpdateNotify message may include an address of the P-CSCF (not shown in FIG. 4) at IMS 135. A P-CSCF may be the first point of contact for an IMS terminal and packets destined for IMS 135 may include the address of the P-CSCF. At 418, SMF 134 transmits flow filters with the address of the P-CSCF to UE 102 over the N1 interface and UE 102 may respond with an ACK. UE 102 may store the address of the P-CSCF for addressing packets destined for IMS 135.

At 420, UE 102 creates a packet-in-packet or tunnel-in-tunnel encapsulation using the address of the P-CSCF received at 418 and the address of N3IWF 137 received at 410. For example, packets transmitted from UE 102 to IMS 135 may flow through a first IPSec tunnel from UE 102 to N3IWF 137 and may flow through a second GTP tunnel from N3IWF 137 to IMS 135. UE 102 may use the IP address of N3IWF 137 and the IP address of the P-CSCF at IMS 135 to create a packet-in-packet or a tunnel-in-tunnel encapsulation to route data packets associated with a data flow to IMS 135. The data packets include the DSCP markings associated with a QoS level for the data flow. In this way, the QoS for the data flow in the PLMN domain 130 may be mirrored in the SNPN domain 120.

When a PLMN flow, such as the data flow from IMS 135, is removed by PCF 132, the corresponding flow in the SNPN domain 120 is removed by PCF 132 on PCF 122 by triggering the Npcf_PolicyAuthorization_Update to remove the flow in the SNPN domain 120. Once the PLMN PDU session for UE 102 is deleted in the PLMN domain 130, the PCF 132 in the PLMN domain 130 will trigger removal of application session binding in the SNPN domain via the PCF 122 in the SNPN domain 120.

Figure 5:
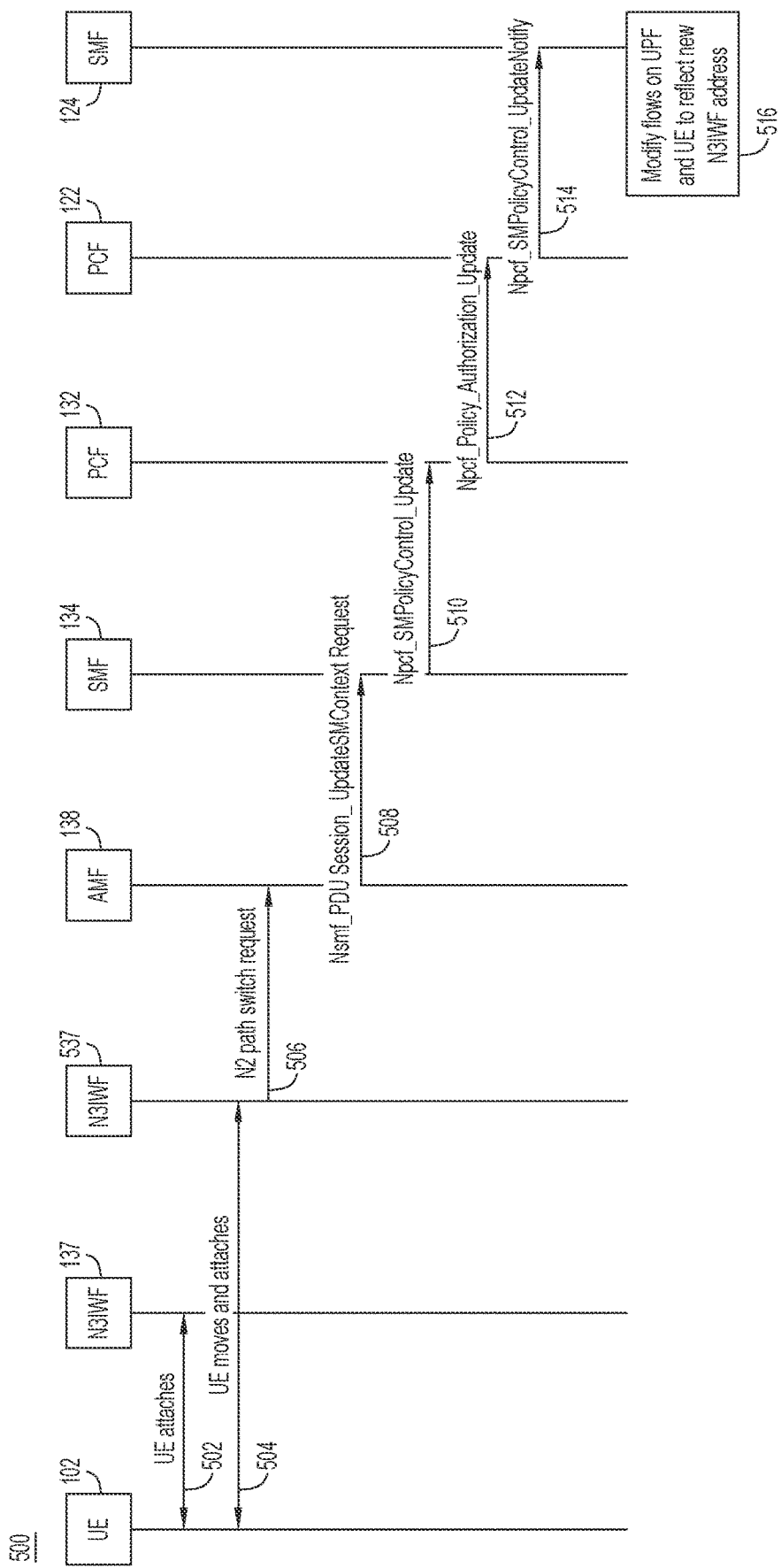
FIG. 5 is a message sequence diagram illustrating a call flow associated with updating path information based on a change in location of a user device, according to example embodiments.

Referring to FIG. 5, FIG. 5 is a message sequence diagram illustrating a call flow 500 that illustrates modifying an N3IWF associated with a data flow based on a change of location of UE 102. FIG. 5 includes UE 102, N3IWF 137, AMF 138, SMF 134, PCF 132, PCF 122, and SMF 124. A second N3IWF, N3IWF 537, is also shown in FIG. 5 to illustrate an N3IWF through which UE 102 establishes a PDU session in the PLMN domain 130 when UE 102 changes location.

As discussed above, a new PCF trigger for a N3IWF change (CH_N3IWF) may be introduced in PolicyCtrl-ReqTriggers on the N7 interface that indicates that a PCF (e.g., PCF 132) is to be notified by an SMF (e.g., SMF 134) when there is a change in the N3IWF associated with a PLMN PDU session. For example, as described below with respect to FIG. 5, when UE 102 changes location and the PDU session in the PLMN domain 130 is established over a new N3IWF, SMF 134 may notify PCF 132 of the N3IWF change and PCF 132 may transmit information associated with the new N3IWF to the SNPN domain 120 to update UPF 126 and UE 102.

Referring to FIG. 5, at 502, consider that UE 102 forms a PDN connection/PDU session with PLMN domain 130 over N3IWF 137 as described above with respect to FIGS. 1-4. In the example given in FIG. 5, at 504, UE 102 changes location and forms the PDN connection/PDU session with PLMN domain 130 through N3IWF 537. For example, UE 102 may move to a new location and UE 102 may not be able to access N3IWF 137 or UE 102 may be better served by N3IWF 537 than by N3IWF 137 at the new location. In this scenario, the PDN connection/PDU session with PLMN domain 130 may be re-routed and established through N3IWF 537 instead of through N3IWF 137.

At 506, N3IWF 537 transmits an N2 path switch request to AMF 138 including an address of N3IWF 537. At 508, AMF 138 transmits an Nsmf_PDUSession_UpdateSMContext message to SMF 134 including an address of N3IWF 537. In the implementation in which UE 102 is connected from an ePDG to PLMN domain 130, UE 102 may change locations and may connect to PLMN domain 130 from a different ePDG. In this implementation, SMF 134 may transmit the address of the different ePDG over the N7 interface to PCF 132.

At 510, SMF 134 transmits an Npcf_SMPolicyControl_Update message including the address of N3IWF 537 to PCF 132. At 512, PCF 132 creates a new mediaComponent with the address of N3IWF 537 and transmits the new mediaComponent information element with the address of N3IWF 537 to PCF 122 in an Ncpf_Policy_Authorization_Update message. At 514, PCF 122 transmits an UpdateNotify message to SMF 124 with the address of N3IWF 537 in flow filters. At 516, SMF 124 replaces the filters on UPF 136 (not shown in FIG. 5) and UE 102 with the address of N3IWF 537. In this way, UE 102 may address packets to IMS 135 (or a different application in PLMN domain 130) using the address of N3IWF 537 and the data flow in the PLMN domain 130 may continue to be mirrored in the SNPN domain 120.

Figure 6:
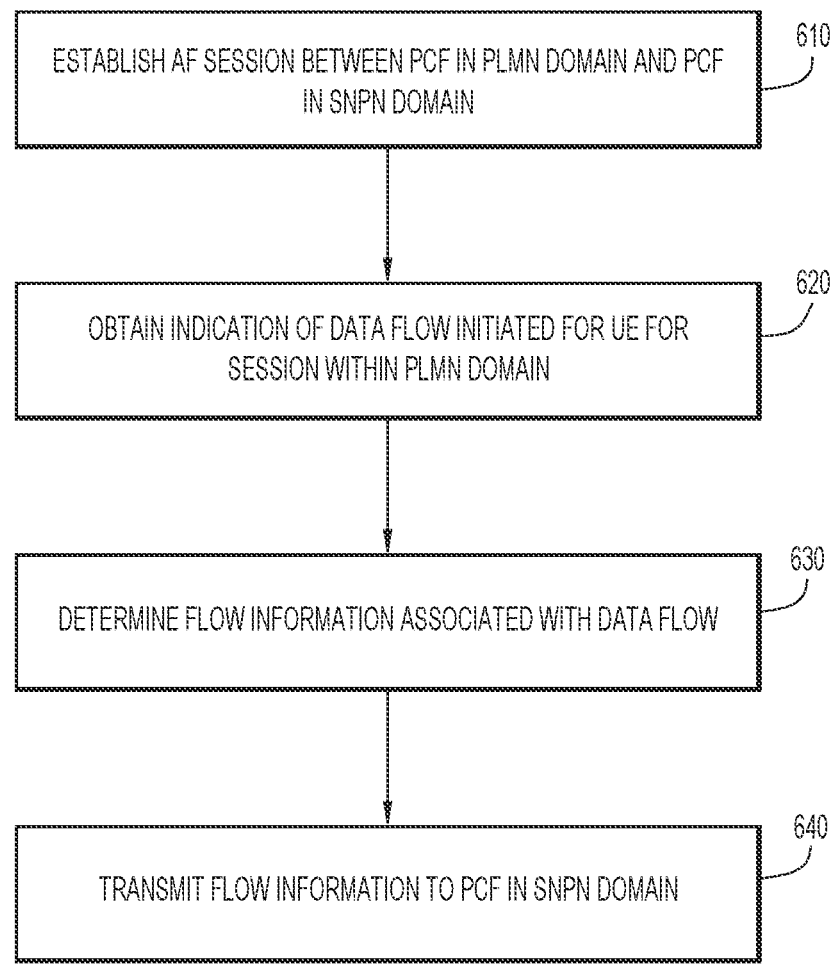
FIG. 6 is a flow chart depicting a method of establishing a session and a dedicated flow and transmitting flow information via the session, according to an example embodiment.

FIG. 6 is a flow chart illustrating a method 600 of establishing an AF session and a dedicated flow and transmitting flow information from PCF 132 to PCF 122, according to an example embodiment.

At 610, an AF session is established between PCF 132 in PLMN domain 130 and PCF 122 in SNPN domain 120. In this example, UE 102 may have established a first PDN connection/PDU session with a data network in the SNPN domain 120 and the AF session is established for a second PDN connection/PDU session that is being established for UE 102 with the PLMN domain 130 via an N3IWF (e.g., N3IWF 137). The AF session is bound to the first PDN connection/PDU session by PCF 122 in the SNPN domain 120. As discussed above with respect to FIG. 3, PCF 132 may discover PCF 122 using BSF 133 with the GPSI of UE 102 and a DNN associated with UE 102 in the SNPN domain 120 as binding parameters. After discovering PCF 122, PCF 132 may create an AF session on PCF 122 via an N5 interface. At 620, an indication of a data flow that is initiated for the UE 102 for the second session within the PLMN domain 130 is obtained. For example, PCF 132 may receive a trigger from an application in the PLMN domain 130 (e.g., IMS 135) indicating an establishment of a data flow with UE 102. At 630, flow information associated with the data flow is determined by PCF 132 of the PLMN domain 130. For example, PCF 132 may determine a QCI/5QI value associated with the data flow and use a local QCI/5QI to DSCP mapping DB 152 to determine a DSCP value associated with the data flow. PCF 132 may determine additional information associated with the data flow, such as a QoS associated with the application, ARP values, etc.

At 640, the flow information is transmitted from PCF 132 of the PLMN domain 130 to PCF 122 of the SNPN domain 120 using the AF session established over the N5 interface in order to facilitate creating/mirroring the data flow in the SNPN domain 120. For example, PCF 132 may transmit the flow information and additional information, such as an IP address associated with an N3IWF through which the second PDN connection/PDU session is established (e.g., N3IWF 137) to PCF 122 over the N5 interface. PCF 122 may transmit the information to UE 102 for addressing packets in the data flow to the application and labeling the packets with the DSCP. For example, UE 102 may create a packet-in-packet or tunnel-in-tunnel encapsulation using the addresses of the N3IWF and the application for transmitting packets in the data flow through IPSec tunnels based on the DSCP values. In this way, a QoS associated with the data flow in the PLMN domain 130 may be enforced in the SNPN domain 120.

Figure 7:
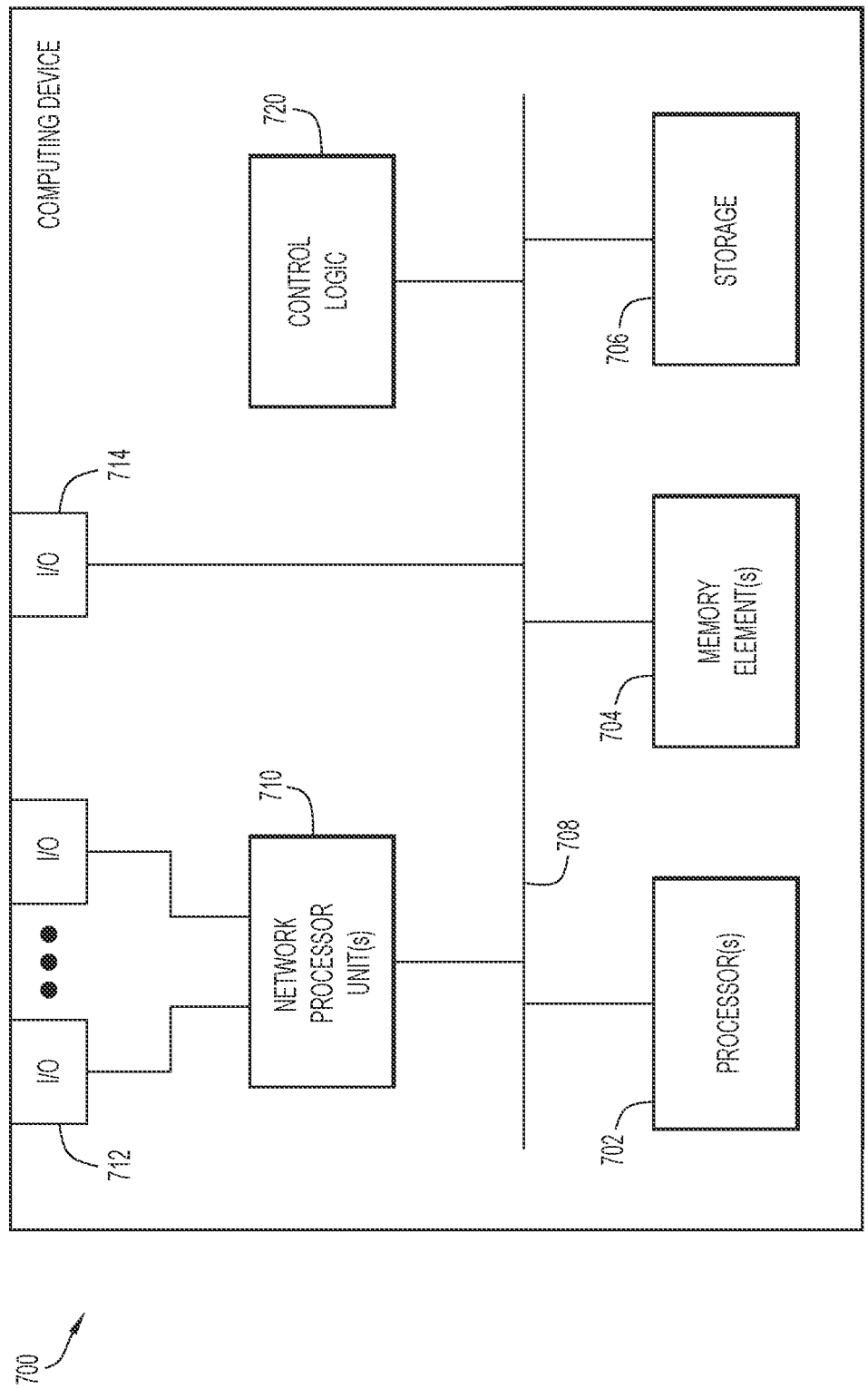
FIG. 7 is a hardware block diagram of a computing device that may perform functions associated with any combination of operations, in connection with the techniques discussed herein.

Referring to FIG. 7, FIG. 7 illustrates a hardware block diagram of a computing device 700 that may perform functions associated with delaying processing of an error indication as discussed herein in connection with the techniques described herein. In various embodiments, a computing device, such as computing device 700 or any combination of computing devices 700, may be configured as any of a PCF, AMF, SMF, UPF, N3IWF, BSF, etc. as discussed for the techniques discussed herein.

It should be appreciated that FIG. 7 provides only an illustration of one embodiment and does not imply any limitations with regard to the environments in which different embodiments may be implemented. Many modifications to the depicted environment may be made.

In at least one embodiment, computing device 700 may be any apparatus that may include one or more processor(s) 702, one or more memory element(s) 704, storage 706, a bus 708, one or more network processor unit(s) 710 interconnected with one or more network input/output (I/O) interface(s) 712, one or more I/O interface(s) 714, and control logic 720. In various embodiments, instructions associated with logic for computing device 700 can overlap in any manner and are not limited to the specific allocation of instructions and/or operations described herein.

In at least one embodiment, processor(s) 702 is/are at least one hardware processor configured to execute various tasks, operations and/or functions for computing device 700 as described herein according to software and/or instructions configured for computing device. Processor(s) 702 (e.g., hardware processor(s)) can execute any type of instructions associated with data to achieve the operations detailed herein. In one example, processor(s) 702 can transform an element or an article (e.g., data, information) from one state or thing to another state or thing. Any of potential processing elements, microprocessors, digital signal processor, baseband signal processor, modem, PHY, controllers, systems, managers, logic, and/or machines described herein can be construed as being encompassed within the broad term 'processor'.

In at least one embodiment, memory element(s) 704 and/or storage 706 is/are configured to store data, information, software, and/or instructions associated with computing device 700, and/or logic configured for memory element(s) 704 and/or storage 706. For example, any logic described herein (e.g., control logic 720) can, in various embodiments, be stored for computing device 700 using any combination of memory element(s) 704 and/or storage 706. Note that in some embodiments, storage 706 can be consolidated with memory element(s) 704 (or vice versa), or can overlap/exist in any other suitable manner.

In at least one embodiment, bus 708 can be configured as an interface that enables one or more elements of computing device 700 to communicate in order to exchange information and/or data. Bus 708 can be implemented with any architecture designed for passing control, data and/or information between processors, memory elements/storage, peripheral devices, and/or any other hardware and/or software components that may be configured for computing device 700. In at least one embodiment, bus 708 may be implemented as a fast kernel-hosted interconnect, potentially using shared memory between processes (e.g., logic), which can enable efficient communication paths between the processes.

In various embodiments, network processor unit(s) 710 may enable communication between computing device 700 and other systems, entities, etc., via network I/O interface(s) 712 to facilitate operations discussed for various embodiments described herein. In various embodiments, network processor unit(s) 710 can be configured as a combination of hardware and/or software, such as one or more Ethernet driver(s) and/or controller(s) or interface cards, Fibre Channel (e.g., optical) driver(s) and/or controller(s), and/or other similar network interface driver(s) and/or controller(s) now known or hereafter developed to enable communications between computing device 700 and other systems, entities, etc. to facilitate operations for various embodiments described herein. In various embodiments, network I/O interface(s) 712 can be configured as one or more Ethernet port(s), Fibre Channel ports, and/or any other I/O port(s) now known or hereafter developed. Thus, the network processor unit(s) 710 and/or network I/O interface(s) 712 may include suitable interfaces for receiving, transmitting, and/or otherwise communicating data and/or information in a network environment.

I/O interface(s) 714 allow for input and output of data and/or information with other entities that may be connected to computing device 700. For example, I/O interface(s) 714 may provide a connection to external devices such as a keyboard, keypad, a touch screen, and/or any other suitable input device now known or hereafter developed. In some instances, external devices can also include portable computer readable (non-transitory) storage media such as database systems, thumb drives, portable optical or magnetic disks, and memory cards. In still some instances, external devices can be a mechanism to display data to a user, such as, for example, a computer monitor, a display screen, or the like.

In various embodiments, control logic 720 can include instructions that, when executed, cause processor(s) 702 to perform operations, which can include, but not be limited to, providing overall control operations of computing device; interacting with other entities, systems, etc. described herein; maintaining and/or interacting with stored data, information, parameters, etc. (e.g., memory element(s), storage, data structures, databases, tables, etc.); combinations thereof; and/or the like to facilitate various operations for embodiments described herein.

Figure 8:
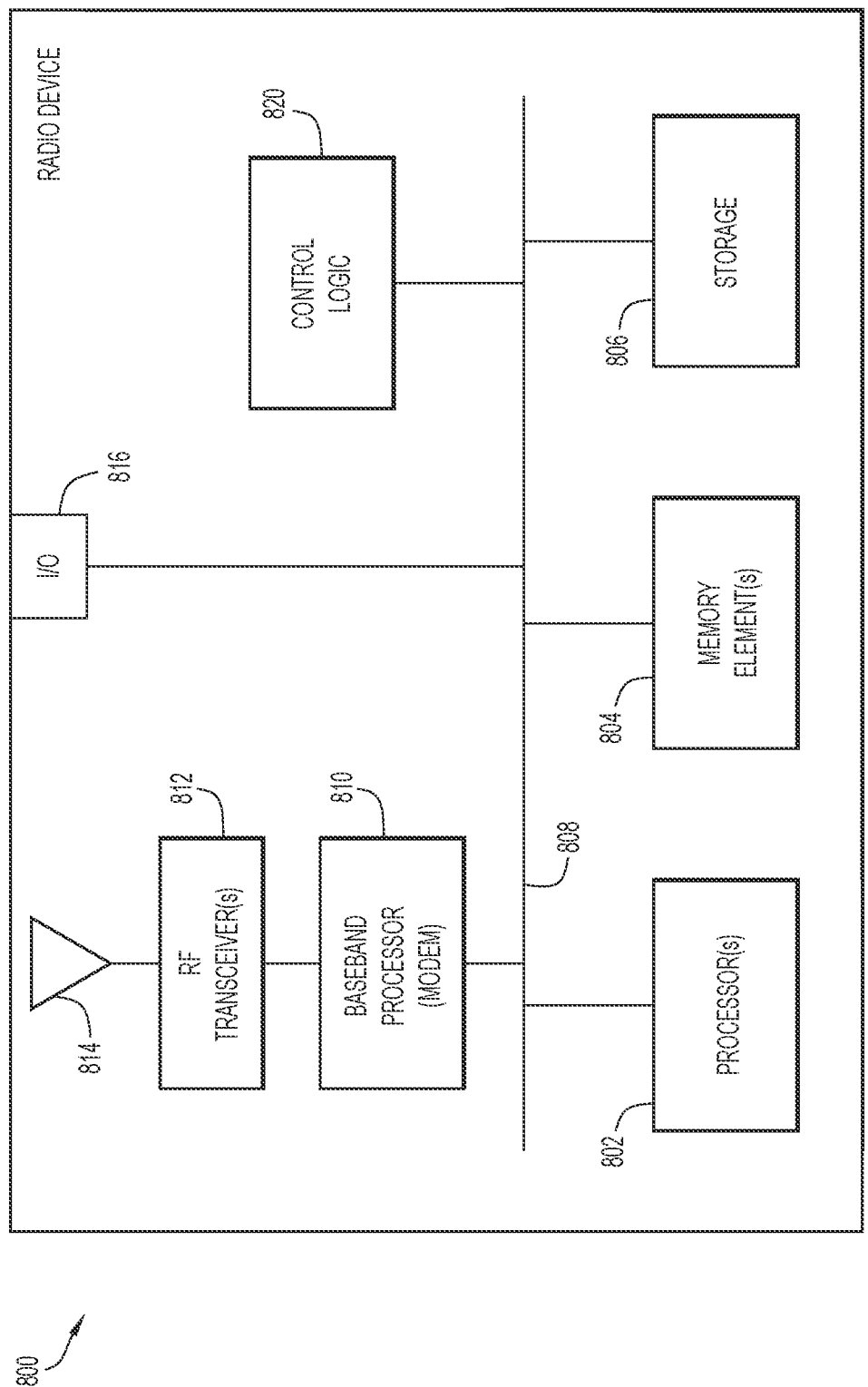
FIG. 8 is a hardware block diagram of a radio device that may perform functions associated with any combination of operations, in connection with the techniques discussed herein.

Referring to FIG. 8, FIG. 8 illustrates a hardware block diagram of a radio device 800 that may perform functions associated with operations discussed herein. In various embodiments, a user equipment or apparatus, such as radio device 800 or any combination of radio device 800, may be configured as any radio node/nodes as depicted herein in order to perform operations of the various techniques discussed herein, such as operations that may be performed by any of a user device, such as UE 102.

In at least one embodiment, radio device 800 may be any apparatus that may include one or more processor(s) 802, one or more memory element(s) 804, storage 806, a bus 808, a baseband processor or modem 810, one or more radio RF transceiver(s) 812, one or more antennas or antenna arrays 814, one or more I/O interface(s) 816, and control logic 820.

The one or more processor(s) 802, one or more memory element(s) 804, storage 806, bus 808, and I/O interface(s) 816 may be configured/implemented in any manner described herein, such as described herein at least with reference to FIG. 7.

The RF transceiver(s) 812 may perform RF transmission and RF reception of wireless signals via antenna(s)/antenna array(s) 814, and the baseband processor (modem) 810 performs baseband modulation and demodulation, etc. associated with such signals to enable wireless communications for radio device 800.

In various embodiments, control logic 820, can include instructions that, when executed, cause processor(s) 802 to perform operations, which can include, but not be limited to, providing overall control operations of radio device 800; interacting with other entities, systems, etc. described herein; maintaining and/or interacting with stored data, information, parameters, etc. (e.g., memory element(s), storage, data structures, databases, tables, etc.); combinations thereof; and/or the like to facilitate various operations for embodiments described herein.

The programs described herein (e.g., control logic 720/820) may be identified based upon application(s) for which they are implemented in a specific embodiment. However, it should be appreciated that any particular program nomenclature herein is used merely for convenience; thus, embodiments herein should not be limited to use(s) solely described in any specific application(s) identified and/or implied by such nomenclature.

In various embodiments, any entity or apparatus as described herein may store data/information in any suitable volatile and/or non-volatile memory item (e.g., magnetic hard disk drive, solid state hard drive, semiconductor storage device, random access memory (RAM), read only memory (ROM), erasable programmable read only memory (EPROM), application specific integrated circuit (ASIC), etc.), software, logic (fixed logic, hardware logic, programmable logic, analog logic, digital logic), hardware, and/or in any other suitable component, device, element, and/or object as may be appropriate. Any of the memory items discussed herein should be construed as being encompassed within the broad term 'memory element'. Data/information being tracked and/or sent to one or more entities as discussed herein could be provided in any database, table, and register, list, cache, storage, and/or storage structure: all of which can be referenced at any suitable timeframe. Any such storage options may also be included within the broad term 'memory element' as used herein.

Note that in certain example implementations, operations as set forth herein may be implemented by logic encoded in one or more tangible media that is capable of storing instructions and/or digital information and may be inclusive of non-transitory tangible media and/or non-transitory computer readable storage media (e.g., embedded logic provided in: an ASIC, digital signal processing (DSP) instructions, software [potentially inclusive of object code and source code], etc.) for execution by one or more processor(s), and/or other similar machine, etc. Generally, memory element(s) 704/804 and/or storage 706/806 can store data, software, code, instructions (e.g., processor instructions), logic, parameters, combinations thereof, and/or the like used for operations described herein. This includes memory element(s) 704/804 and/or storage 706/806 being able to store data, software, code, instructions (e.g., processor instructions), logic, parameters, combinations thereof, or the like that are executed to carry out operations in accordance with teachings of the present disclosure.

In some instances, software of the present embodiments may be available via a non-transitory computer useable medium (e.g., magnetic or optical mediums, magneto-optic mediums, CD-ROM, DVD, memory devices, etc.) of a stationary or portable program product apparatus, downloadable file(s), file wrapper(s), object(s), package(s), container(s), and/or the like. In some instances, non-transitory computer readable storage media may also be removable. For example, a removable hard drive may be used for memory/storage in some implementations. Other examples may include optical and magnetic disks, thumb drives, and smart cards that can be inserted and/or otherwise connected to a computing device for transfer onto another computer readable storage medium.

In one form, a method is provided that may include establishing an application function (AF) session between a first policy control function (PCF) in a standalone non-public network (SNPN) domain and a second PCF in a Public Land Mobile Network (PLMN) domain, wherein a user equipment has a first session with the SNPN domain, the AF session is established for a second session of the user equipment with the PLMN domain, and the AF session is bound to the first session; obtaining, by the second PCF, an indication of a data flow initiated for the user equipment for the second session within the PLMN domain; determining flow information associated with the data flow; and transmitting, from the second PCF to the first PCF, the flow information associated with the data flow for creating the data flow in the SNPN domain.

In one example, establishing the AF session includes establishing the AF session includes establishing the AF session via an N5 interface between the first PCF in the SNPN domain and the second PCF in the PLMN domain. In another example, the flow information includes quality of service (QoS) information associated with the data flow. In another example, the second PCF stores a first database that maps QoS values to differentiated services code point (DSCP) values, and the method further comprises: determining a QoS value associated with the data flow; and performing a lookup in the first database using the QoS value to determine a corresponding DSCP value; and transmitting the flow information comprises transmitting the DSCP value.

In another example, the second session is established over a non-third (3rd) generation partnership program (3GPP) interworking function (N3IWF) in the PLMN domain, the second PCF stores a second database that maps data network names (DNNs) in the PLMN domain to DNNs in the SNPN domain, and establishing the AF session further comprises: obtaining, at the second PCF from a session management function (SMF) in the PLMN domain, an Internet Protocol (IP) address associated with the N3IWF, an IP address associated with the user equipment, a generic public subscriber identifier (GPSI) associated with the user equipment, and a DNN associated with the PLMN domain; performing a lookup in the second database using the DNN associated with the PLMN domain to determine a DNN associated with the SNPN domain; discovering, by the second PCF, the first PCF via a binding support function (BSF), wherein the DNN associated with the SNPN domain and the GPSI associated with the UE are used as binding parameters for the BSF; and transmitting, from the second PCF to the first PCF, a policy authorization create request including the DNN associated with the SNPN domain and the GPSI associated with the user equipment to establish the AF session between the first PCF in the SNPN domain and the second PCF in the PLMN domain.

In another example, the second session is established over a first N3IWF of the PLMN domain and the method further comprises obtaining, at an SMF in the PLMN domain, an indication that the second session has changed from being established over the first N3IWF to being established over a second N3IWF; transmitting, by the SMF to the second PCF, an identifier associated with the second N3IWF; and transmitting, by the second PCF to the first PCF, an authorization update including the identifier associated with the second N3IWF. In another example, transmitting the flow information comprises transmitting a policy authorization update including a DSCP value associated with the data flow, an address associated with a N3IWF in the PLMN domain over which the second session is established, Quality of Service (QoS) information associated with an application associated with the data flow, and allocation and retention priority (ARP) values associated with the data flow.

In another form, an apparatus is provided comprising a memory for storing data; a network interface configured to enable network communications; and a processor for executing instructions associated with the data, wherein executing the instructions causes the apparatus to perform operations, comprising: establishing an application function (AF) session between a first policy control function (PCF) in a standalone non-public network (SNPN) domain and a second PCF in a Public Land Mobile Network (PLMN) domain, wherein a user equipment has a first session with the SNPN domain, the AF session is established for a second session of the user equipment with the PLMN domain, and the AF session is bound to the first session; obtaining an indication of a data flow initiated for the user equipment for the second session within the PLMN domain; determining flow information associated with the data flow; and transmitting, to the first PCF, the flow information associated with the data flow for creating the data flow in the SNPN domain.

In still another form, one or more non-transitory computer-readable storage media encoded with instructions that, when executed by a processor, cause the processor to perform operations, comprising: establishing an application function (AF) session between a first policy control function (PCF) in a standalone non-public network (SNPN) domain and a second PCF in a Public Land Mobile Network (PLMN) domain, wherein a user equipment has a first session with the SNPN domain, the AF session is established for a second session of the user equipment with the PLMN domain, and the AF session is bound to the first session; obtaining an indication of a data flow initiated for the user equipment for the second session within the PLMN domain; determining flow information associated with the data flow; and transmitting, to the second PCF, the flow information associated with the data flow for creating the data flow in the SNPN domain.

Variations and Implementations

Embodiments described herein may include one or more networks, which can represent a series of points and/or network elements of interconnected communication paths for receiving and/or transmitting messages (e.g., packets of information) that propagate through the one or more networks. These network elements offer communicative interfaces that facilitate communications between the network elements. A network can include any number of hardware and/or software elements coupled to (and in communication with) each other through a communication medium. Such networks can include, but are not limited to, any local area network (LAN), virtual LAN (VLAN), wide area network (WAN) (e.g., the Internet), software defined WAN (SD-WAN), wireless local area (WLA) access network, wireless wide area (WWA) access network, metropolitan area network (MAN), Intranet, Extranet, virtual private network (VPN), Low Power Network (LPN), Low Power Wide Area Network (LPWAN), Machine to Machine (M2M) network, Internet of Things (IoT) network, Ethernet network/switching system, any other appropriate architecture and/or system that facilitates communications in a network environment, and/or any suitable combination thereof.

Networks through which communications propagate can use any suitable technologies for communications including wireless communications (e.g., 4G/5G/nG, IEEE 802.11 (e.g., Wi-Fi®/Wi-Fi6®), IEEE 802.16 (e.g., Worldwide Interoperability for Microwave Access (WiMAX)), Radio-Frequency Identification (RFID), Near Field Communication (NFC), Bluetooth™, mm.wave, Ultra-Wideband (UWB), etc.), and/or wired communications (e.g., T1 lines, T3 lines, digital subscriber lines (DSL), Ethernet, Fibre Channel, etc.). Generally, any suitable means of communications may be used such as electric, sound, light, infrared, and/or radio to facilitate communications through one or more networks in accordance with embodiments herein. Communications, interactions, operations, etc. as discussed for various embodiments described herein may be performed among entities that may directly or indirectly connected utilizing any algorithms, communication protocols, interfaces, etc. (proprietary and/or non-proprietary) that allow for the exchange of data and/or information.

In various example implementations, any entity or apparatus for various embodiments described herein can encompass network elements (which can include virtualized network elements, functions, etc.) such as, for example, network appliances, forwarders, routers, servers, switches, gateways, bridges, load balancers, firewalls, processors, modules, radio receivers/transmitters, and/or any other suitable device, component, element, or object operable to exchange information that facilitates or otherwise helps to facilitate various operations in a network environment as described for various embodiments herein. Note that with the examples provided herein, interaction may be described in terms of one, two, three, or four entities. However, this has been done for purposes of clarity, simplicity and example only. The examples provided should not limit the scope or inhibit the broad teachings of systems, networks, etc. described herein as potentially applied to a myriad of other architectures.

Communications in a network environment can be referred to herein as 'messages', 'messaging', 'signaling', 'data', 'content', 'objects', 'requests', 'queries', 'responses', 'replies', etc. which may be inclusive of packets. As referred to herein and in the claims, the term 'packet' may be used in a generic sense to include packets, frames, segments, datagrams, and/or any other generic units that may be used to transmit communications in a network environment. Generally, a packet is a formatted unit of data that can contain control or routing information (e.g., source and destination address, source and destination port, etc.) and data, which is also sometimes referred to as a 'payload', 'data payload', and variations thereof. In some embodiments, control or routing information, management information, or the like can be included in packet fields, such as within header(s) and/or trailer(s) of packets. Internet Protocol (IP) addresses discussed herein and in the claims can include any IP version 4 (IPv4) and/or IP version 6 (IPv6) addresses.

To the extent that embodiments presented herein relate to the storage of data, the embodiments may employ any number of any conventional or other databases, data stores or storage structures (e.g., files, databases, data structures, data or other repositories, etc.) to store information.

Note that in this Specification, references to various features (e.g., elements, structures, nodes, modules, components, engines, logic, steps, operations, functions, characteristics, etc.) included in 'one embodiment', 'example embodiment', 'an embodiment', 'another embodiment', 'certain embodiments', 'some embodiments', 'various embodiments', 'other embodiments', 'alternative embodiment', and the like are intended to mean that any such features are included in one or more embodiments of the present disclosure, but may or may not necessarily be combined in the same embodiments. Note also that a module, engine, client, controller, function, logic or the like as used herein in this Specification, can be inclusive of an executable file comprising instructions that can be understood and processed on a server, computer, processor, machine, compute node, combinations thereof, or the like and may further include library modules loaded during execution, object files, system files, hardware logic, software logic, or any other executable modules.

It is also noted that the operations and steps described with reference to the preceding figures illustrate only some of the possible scenarios that may be executed by one or more entities discussed herein. Some of these operations may be deleted or removed where appropriate, or these steps may be modified or changed considerably without departing from the scope of the presented concepts. In addition, the timing and sequence of these operations may be altered considerably and still achieve the results taught in this disclosure. The preceding operational flows have been offered for purposes of example and discussion. Substantial flexibility is provided by the embodiments in that any suitable arrangements, chronologies, configurations, and timing mechanisms may be provided without departing from the teachings of the discussed concepts.

As used herein, unless expressly stated to the contrary, use of the phrase 'at least one of', 'one or more of', 'and/or', variations thereof, or the like are open-ended expressions that are both conjunctive and disjunctive in operation for any and all possible combination of the associated listed items. For example, each of the expressions 'at least one of X, Y and Z', 'at least one of X, Y or Z', 'one or more of X, Y and Z', 'one or more of X, Y or Z' and 'X, Y and/or Z' can mean any of the following: 1) X, but not Y and not Z; 2) Y, but not X and not Z; 3) Z, but not X and not Y; 4) X and Y, but not Z; 5) X and Z, but not Y; 6) Y and Z, but not X; or 7) X, Y, and Z.

Additionally, unless expressly stated to the contrary, the terms 'first', 'second', 'third', etc., are intended to distinguish the particular nouns they modify (e.g., element, condition, node, module, activity, operation, etc.). Unless expressly stated to the contrary, the use of these terms is not intended to indicate any type of order, rank, importance, temporal sequence, or hierarchy of the modified noun. For example, 'first X' and 'second X' are intended to designate two 'X' elements that are not necessarily limited by any order, rank, importance, temporal sequence, or hierarchy of the two elements. Further as referred to herein, 'at least one of' and 'one or more of' can be represented using the '(s)' nomenclature (e.g., one or more element(s)).

One or more advantages described herein are not meant to suggest that any one of the embodiments described herein necessarily provides all of the described advantages or that all the embodiments of the present disclosure necessarily provide any one of the described advantages. Numerous other changes, substitutions, variations, alterations, and/or modifications may be ascertained to one skilled in the art and it is intended that the present disclosure encompass all such changes, substitutions, variations, alterations, and/or modifications as falling within the scope of the appended claims.

What is claimed is:

1. A method comprising:
   establishing an application function (AF) session between a first policy control function (PCF) in a standalone non-public network (SNPN) domain and a second PCF in a Public Land Mobile Network (PLMN) domain, wherein a user equipment has a first session with the SNPN domain, the AF session is established for a second session of the user equipment with the PLMN domain, the AF session is established based on the second PCF identifying the first PCF when the second session is established, and the AF session is bound to the first session;
   obtaining, by the second PCF, an indication of a data flow initiated for the user equipment for the second session within the PLMN domain;
   determining flow information associated with the data flow; and
   transmitting, from the second PCF to the first PCF, the flow information associated with the data flow for creating the data flow in the SNPN domain, wherein transmitting the flow information comprises transmitting a policy authorization update including a differentiated services code point (DSCP) value associated with the data flow, an address associated with a non-third (3rd) generation partnership program (3GPP) interworking function (N3IWF) in the PLMN domain over which the second session is established, Quality of Service (QoS) information associated with an application associated with the data flow, and allocation and retention priority (ARP) values associated with the data flow.

2. The method of claim 1, wherein establishing the AF session includes establishing the AF session via an N5 interface between the first PCF in the SNPN domain and the second PCF in the PLMN domain.

3. The method of claim 1, wherein the flow information includes QoS information associated with the data flow.

4. The method of claim 1, wherein the second PCF stores a first database that maps QoS values to DSCP values, wherein the method further comprises:
   determining a QoS value associated with the data flow; and performing a lookup in the first database using the QoS value to determine a corresponding DSCP value;
wherein transmitting the flow information comprises transmitting the DSCP value.

5. The method of claim 1, wherein the second session is established over a N3IWF in the PLMN domain, wherein the second PCF stores a second database that maps data network names (DNNs) in the PLMN domain to DNNs in the SNPN domain, and wherein establishing the AF session further comprises:
obtaining, at the second PCF from a session management function (SMF) in the PLMN domain, an Internet Protocol (IP) address associated with the N3IWF, an IP address associated with the user equipment, a generic public subscriber identifier (GPSI) associated with the user equipment, and a DNN associated with the PLMN domain;
performing a lookup in the second database using the DNN associated with the PLMN domain to determine a DNN associated with the SNPN domain;
discovering, by the second PCF, the first PCF via a binding support function (BSF), wherein the DNN associated with the SNPN domain and the GPSI associated with the user equipment are used as binding parameters for the BSF; and
transmitting, from the second PCF to the first PCF, a policy authorization create request including the DNN associated with the SNPN domain and the GPSI associated with the user equipment to establish the AF session between the first PCF in the SNPN domain and the second PCF in the PLMN domain.

6. The method of claim 1, wherein the second session is established over a first N3IWF of the PLMN domain, the method further comprising:
obtaining, at an SMF in the PLMN domain, an indication that the second session has changed from being established over the first N3IWF to being established over a second N3IWF;
transmitting, by the SMF to the second PCF, an identifier associated with the second N3IWF; and
transmitting, by the second PCF to the first PCF, an authorization update including the identifier associated with the second N3IWF.

7. An apparatus comprising:
a memory for storing data;
a network interface configured to enable network communications; and
a processor for executing instructions associated with the data, wherein executing the instructions causes the apparatus to perform operations, comprising:
establishing an application function (AF) session between a first policy control function (PCF) in a standalone non-public network (SNPN) domain and a second PCF in a Public Land Mobile Network (PLMN) domain, wherein a user equipment has a first session with the SNPN domain, the AF session is established for a second session of the user equipment with the PLMN domain, the AF session is established based on the second PCF identifying the first PCF when the second session is established, and the AF session is bound to the first session;
obtaining an indication of a data flow initiated for the user equipment for the second session within the PLMN domain;
determining flow information associated with the data flow; and
transmitting, to the first PCF, the flow information associated with the data flow for creating the data flow in the SNPN domain, wherein transmitting the flow information comprises transmitting a policy authorization update including a differentiated services code point (DSCP) value associated with the data flow, an address associated with a non-third (3rd) generation partnership program (3GPP) interworking function (N3IWF) in the PLMN domain over which the second session is established, Quality of Service (QoS) information associated with an application associated with the data flow, and allocation and retention priority (ARP) values associated with the data flow.

8. The apparatus of claim 7, wherein establishing the AF session includes establishing the AF session via an N5 interface between the first PCF in the SNPN domain and the second PCF in the PLMN domain.

9. The apparatus of claim 7, wherein the flow information includes QoS information associated with the data flow.

10. The apparatus of claim 7, wherein the second PCF stores a first database that maps QoS values to DSCP values, wherein the processor further executes instruction to perform operations, comprising:
determining a QoS value associated with the data flow; and
performing a lookup in the first database using the QoS value to determine a corresponding DSCP value, wherein transmitting the flow information comprises transmitting the DSCP value.

11. The apparatus of claim 7, wherein the second session is established over a N3IWF in the PLMN domain, wherein the second PCF stores a second database that maps data network names (DNNs) in the PLMN domain to DNNs in the SNPN domain, and wherein establishing the AF session further comprises:
obtaining, at the second PCF from a session management function (SMF) in the PLMN domain, an Internet Protocol (IP) address associated with the N3IWF, an IP address associated with the user equipment, a generic public subscriber identifier (GPSI) associated with the user equipment, and a DNN associated with the PLMN domain;
performing a lookup in the second database using the DNN associated with the PLMN domain to determine a DNN associated with the SNPN domain;
discovering, by the second PCF, the first PCF via a binding support function (BSF), wherein the DNN associated with the SNPN domain and the GPSI associated with the user equipment are used as binding parameters for the BSF; and
transmitting, to the second PCF, a policy authorization create request including the DNN associated with the SNPN domain and the GPSI associated with the user equipment to establish the AF session between the first PCF in the SNPN domain and the second PCF in the PLMN domain.

12. The apparatus of claim 7, wherein the second session is established over a first N3IWF of the PLMN domain, and wherein the processor further executes instructions to perform operations, comprising:
obtaining, at an SMF in the PLMN domain, an indication that the second session has changed from being established over the first N3IWF to being established over a second N3IWF;
transmitting, by the SMF to the second PCF, an identifier associated with the second N3IWF; and transmitting, by the second PCF to the first PCF, an authorization update including the identifier associated with the second N3IWF.

13. One or more non-transitory computer-readable storage media encoded with instructions that, when executed by a processor, cause the processor to perform operations, comprising:
    establishing an application function (AF) session between a first policy control function (PCF) in a standalone non-public network (SNPN) domain and a second PCF in a Public Land Mobile Network (PLMN) domain, wherein a user equipment has a first session with the SNPN domain, the AF session is established for a second session of the user equipment with the PLMN domain, the AF session is established based on the second PCF identifying the first PCF when the second session is established, and the AF session is bound to the first session;
    obtaining an indication of a data flow initiated for the user equipment for the second session within the PLMN domain;
    determining flow information associated with the data flow; and
    transmitting, to the second PCF, the flow information associated with the data flow for creating the data flow in the SNPN domain, wherein transmitting the flow information comprises transmitting a policy authorization update including a differentiated services code point (DSCP) value associated with the data flow, an address associated with a non-third (3rd) generation partnership program (3GPP) interworking function (N3IWF) in the PLMN domain over which the second session is established, Quality of Service (QoS) information associated with an application associated with the data flow, and allocation and retention priority (ARP) values associated with the data flow.

14. The one or more non-transitory computer-readable storage media of claim 13, wherein establishing the AF session includes establishing the AF session via an N5 interface between the first PCF in the SNPN domain and the second PCF in the PLMN domain.

15. The one or more non-transitory computer-readable storage media of claim 13, wherein the flow information includes QoS information associated with the data flow.

16. The one or more non-transitory computer-readable storage media of claim 13, wherein the second PCF stores a first database that maps QoS values to DSCP values, wherein the instructions further cause the processor to perform operations, comprising:

determining a QoS value associated with the data flow; and
performing a lookup in the first database using the QoS value to determine a corresponding DSCP value, wherein transmitting the flow information comprises transmitting the DSCP value.

17. The one or more non-transitory computer-readable storage media of claim 13, wherein the second session is established over a N3IWFn partnership in the PLMN domain, wherein the second PCF stores a second database that maps data network names (DNNs) in the PLMN domain to DNNs in the SNPN domain, and wherein establishing the AF session further comprises:
    obtaining, at the second PCF and from a session management function (SMF) in the PLMN domain, an Internet Protocol (IP) address associated with the N3IWF, an IP address associated with the user equipment, a generic public subscriber identifier (GPSI) associated with the user equipment, and a DNN associated with the PLMN domain;
    performing a lookup in the second database using the DNN associated with the PLMN domain to determine a DNN associated with the SNPN domain;
    discovering, by the second PCF, the first PCF via a binding support function (BSF), wherein the DNN associated with the SNPN domain and the GPSI associated with the user equipment are used as binding parameters for the BSF; and
    transmitting, from the second PCF to the first PCF, a policy authorization create request including the DNN associated with the SNPN domain and the GPSI associated with the user equipment to establish the AF session between the first PCF in the SNPN domain and the second PCF in the PLMN domain.

18. The one or more non-transitory computer-readable storage media of claim 13, wherein the second session is established over a first N3IWF of the PLMN domain, and wherein the instructions further cause the processor to perform operations, comprising:
    obtaining, at an SMF in the PLMN domain, an indication that the second session has changed from being established over the first N3IWF to being established over a second N3IWF;
    transmitting, by the SMF to the second PCF, an identifier associated with the second N3IWF; and
    transmitting, by the second PCF to the first PCF, an authorization update including the identifier associated with the second N3IWF.

* * * * *

UNITED STATES PATENT AND TRADEMARK OFFICE
CERTIFICATE OF CORRECTION

PATENT NO. : 11,843,512 B2
APPLICATION NO. : 17/410105
DATED : December 12, 2023
INVENTOR(S) : Ravi Shankar Mantha et al.

It is certified that error appears in the above-identified patent and that said Letters Patent is hereby corrected as shown below:

In the Claims

Claim 17, Column 22, Line 9, please replace "established over a N3IWFn partnership in the PLMN" with --established over a N3IWF in the PLMN--

Signed and Sealed this
Twenty-sixth Day of March, 2024

Katherine Kelly Vidal
*Director of the United States Patent and Trademark Office*